United States Patent
Suter et al.

[19]

[11] Patent Number: 5,992,311
[45] Date of Patent: Nov. 30, 1999

[54] JUICE EXTRACTOR WITH HYDRAULIC CONTROL OF EXTRACTION BACK PRESSURE

[75] Inventors: Michael L. Suter, Spring Hill; John A. Freer; Guillermo T. Segredo, both of Lakeland, all of Fla.

[73] Assignee: FMC Corporation, Lakeland, Fla.

[21] Appl. No.: 09/087,682

[22] Filed: May 29, 1998

[51] Int. Cl.$^6$ ................. B30B 9/06; A23N 1/00; A47J 19/02

[52] U.S. Cl. ................. 100/37; 99/495; 99/510; 100/53; 100/98 R; 100/108; 100/213; 426/489

[58] Field of Search ................. 100/37, 98 R, 100/108, 213, 53; 99/495, 509, 510, 513; 426/489

[56] References Cited

U.S. PATENT DOCUMENTS

| | | | |
|---|---|---|---|
| 2,649,730 | 8/1953 | Hait | 100/213 |
| 2,846,943 | 8/1958 | Belk | 100/108 |
| 3,429,257 | 2/1969 | Belk | 100/213 |
| 3,736,865 | 6/1973 | Hait | 100/213 |
| 4,309,943 | 1/1982 | Larsen et al. | 100/213 |
| 4,376,409 | 3/1983 | Belk | 100/213 |
| 4,700,620 | 10/1987 | Cross | 100/213 |
| 4,905,586 | 3/1990 | Anderson et al. . | |
| 4,922,813 | 5/1990 | Compri | 100/213 |
| 4,922,814 | 5/1990 | Anderson et al. . | |
| 4,951,563 | 8/1990 | Warren et al. | 100/213 |
| 4,995,973 | 2/1991 | Ballenger et al. . | |
| 5,070,778 | 12/1991 | Cross et al. . | |
| 5,123,567 | 6/1992 | Anderson . | |
| 5,193,446 | 3/1993 | Olusczak et al. . | |
| 5,339,729 | 8/1994 | Anderson . | |
| 5,386,765 | 2/1995 | Olusczak et al. . | |
| 5,386,766 | 2/1995 | Segredo et al. . | |
| 5,483,870 | 1/1996 | Anderson et al. . | |

FOREIGN PATENT DOCUMENTS

| 64762 | 6/1985 | Israel . |
|---|---|---|

Primary Examiner—Stephen F. Gerrity
Attorney, Agent, or Firm—Allen, Dyer, Doppelt, Milbrath & Gilchrist, P.A.

[57] ABSTRACT

A juice extractor includes a mechanism for supporting the exterior of a fruit and separating the peel therefrom, such as upper and lower cups having cutters to cut plugs. A strainer tube is mounted to receive juice and pulp of the fruit. An orifice tube has upper and lower ends and the upper end is moveable within the strainer tube. A reciprocating drive mechanism engages the orifice tube and reciprocates the orifice tube within the strainer tube for generating pressure within the strainer tube to separate juice and pulp within the strainer tube, collect the core material and discharge core out of the lower end of the orifice tube. A valve assembly is positioned at the lower end of the orifice tube. The valve assembly includes a piston having a shaft moveable into an extended position within the orifice tube, and a retracted position where core can be discharged from the lower end of the orifice tube. A predetermined amount of hydraulic pressure is applied onto the piston to extend the shaft into the orifice tube and apply back pressure. The core is discharged from the pressure of the core pulp against the shaft and piston and exceeds the back pressure to retract the shaft. A sensor can also sense when the cylinder shaft is not retracted or moved in a period of machine cycles, indicative that core is not being discharged from the orifice tube. The juice extractor can be shut down after a predetermined period of time after determining that the shaft has not retracted or extended.

61 Claims, 10 Drawing Sheets

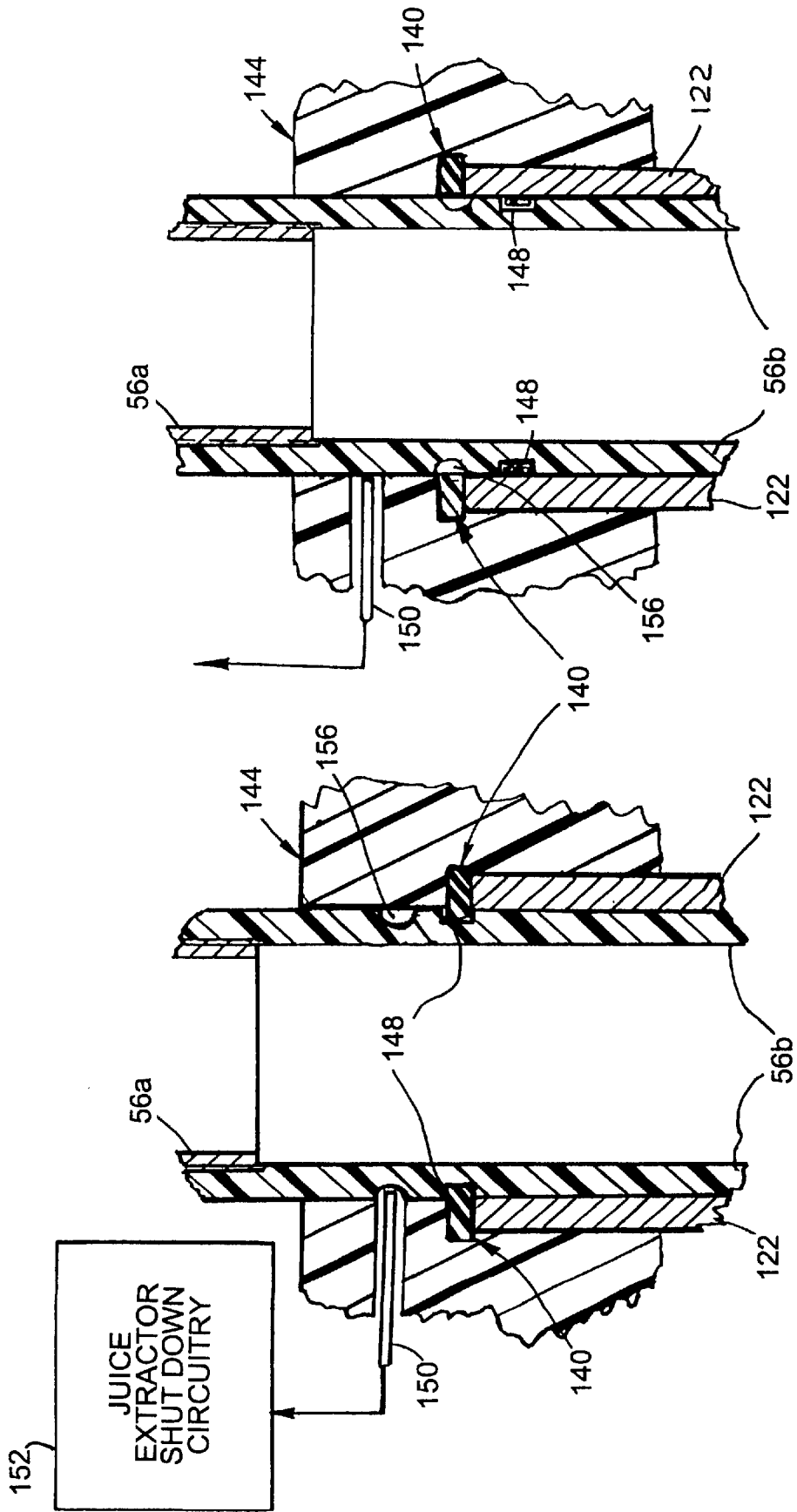

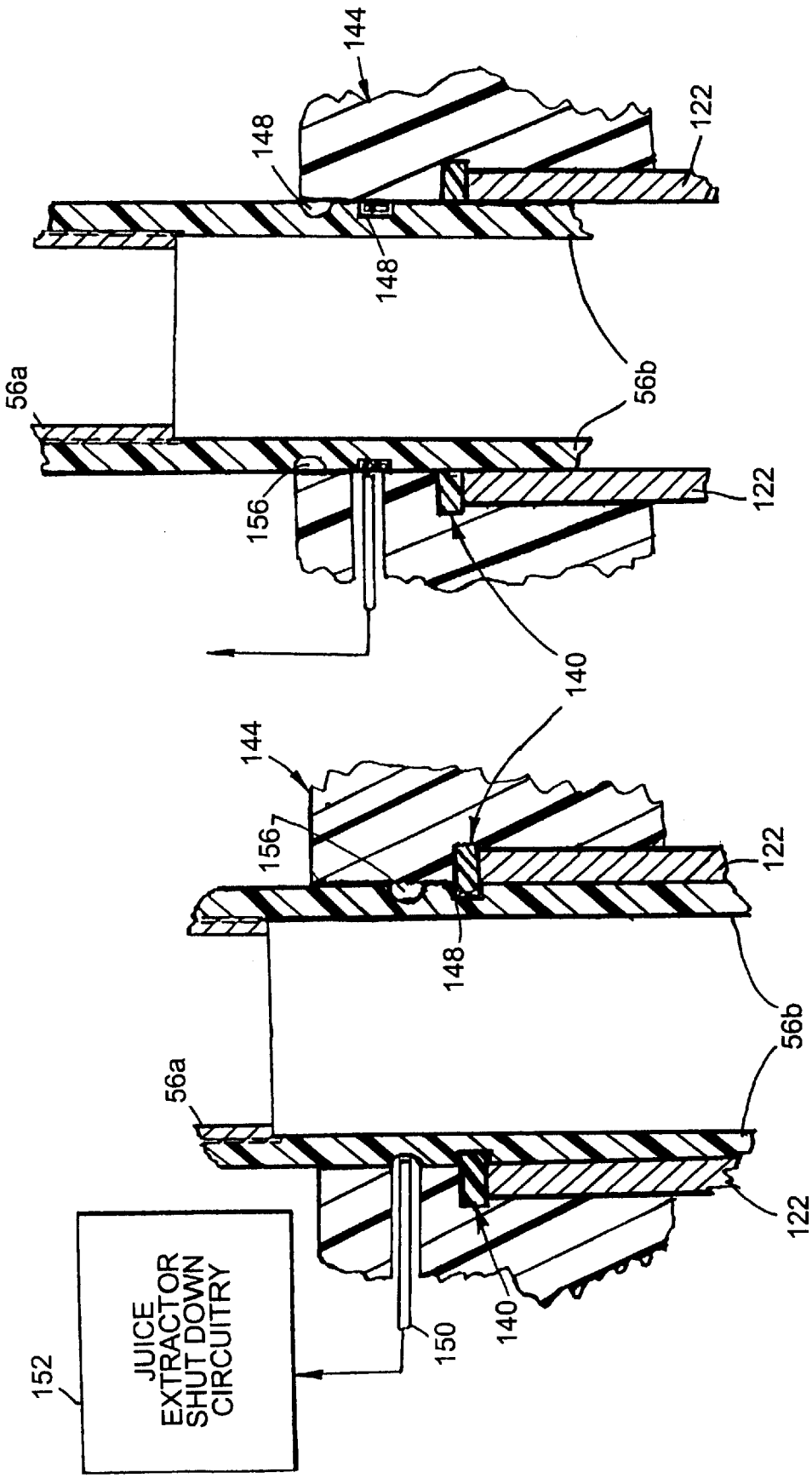

JUICE EXTRACTOR WITH HYDRAULIC CONTROL OF EXTRACTION BACK PRESSURE

FIELD OF THE INVENTION

This invention relates to the field of juice extractors, and more particularly, this invention relates to a juice extractor that has an orifice tube moveable within a strainer tube.

BACKGROUND OF THE INVENTION

One type of well known juice extractor includes a series of juice extractor units that are ganged together. Each juice extractor unit includes upper and lower cups for supporting the fruit. The sides of both upper and lower cups have fingers that intermesh or interdigitate together. The upper cups are mounted on a common cross bar, which moves in a fixed up and down path by means of a cam-drive positioned at the top of the juice extractor machine. The upper cups move into the bottom cups, which remain rigidly positioned.

A fruit, such as an orange, is initially fed into the bottom cup by a cam-operated feeding device, which deposits the fruit in the bottom cup. The upper cup then descends into the lower cup. The fruit is pressed against sharp circular cutters positioned at the top of a strainer tube adjacent the lower cup, and an upper cutter positioned in the upper cup. The two circular cutters cut plugs into both the top and bottom portions of the fruit as the interdigitating fingers of the two cups mesh together. At the same time, the inner portions of the fruit (i.e., the pulp and juice) are forced down into the strainer tube positioned within a manifold. The peeled surfaces of the fruit do not contact the juice as the interdigitating fingers peel the fruit. After the upper cup has descended toward the lower cup, an orifice tube moves upward into the strainer tube. The prior art orifice tube includes a restrictor in its lower end. The orifice tube applies pressure into the internal portion of the strainer tube to separate juice and pulp within the strainer tube, collect the core material and discharge the core material out of the bottom of the orifice tube. The core material typically includes membrane, seeds and peel plugs.

Instead of a restrictor, a valve assembly has been placed against the lower end of the orifice tube, and has been actuated by pneumatic pressure to open and close a valve, such as a piston and shaft, to allow core discharge. The pneumatic pressure applied a back pressure to the orifice tube. As the orifice tube was moved within the strainer tube, the valve was closed by the pneumatic pressure to aid in the extraction process. As core filled the orifice tube, the pressure in the orifice tube became greater than the applied pneumatic pressure and the valve opened, thus allowing discharge of core out of the lower end of the orifice tube.

However, this type of structure has several drawbacks. Air is compressable and as any piston or other assembly was vertically raised at high operating speeds, it sometimes caused a partial vacuum, and it was difficult to control the amount of force on any piston or other assembly. It is essential that every time a core of pulp was placed in the orifice tube during the extraction process, then some core should be removed from the lower end of the orifice tube. If the orifice tube should become clogged, however, such as commonly occurs when a milk weed pod or other similar structure becomes clogged, then no core is removed from the lower end of the orifice tube. As a result, a phenomena occurs called "exploding fruit." The juice cannot be removed from the strainer tube and, as the upper and lower cups are forced together, the fruit explodes. In a worst case scenario, the strainer tube can also explode, and thus, seeds and cores enters the juice and cause major quality problems.

SUMMARY OF THE INVENTION

It is therefore an object of the present invention to provide hydraulic control over any valve assembly positioned at the lower end of the orifice tube to obtain greater control over the back pressure within the orifice tube.

It is still another object of the present invention to be able to detect when an orifice tube is clogged and, if necessary, shut down the juice extractor after a predetermined period of time.

The present invention is advantageous because it now provides a juice extractor that includes a valve assembly positioned at lower end of the orifice tube that is hydraulically controlled, such that a predetermined amount of hydraulic pressure is applied onto a piston to extend a piston shaft into the orifice tube and apply back pressure. The hydraulic pressure can be varied depending on the production requirements necessary during a production run. Additionally, the present invention is advantageous because it includes a means for determining when the cylinder shaft is not retracted indicative that pulp is not being discharged from the orifice tube. After a predetermined period of time from the time when a sensor has determined that pulp is not being discharged, the juice extractor can be shut down by an appropriate shut down mechanism.

In accordance with the present invention, the juice extractor comprises a means for supporting the exterior of a fruit and separating the peel therefrom. A strainer tube is mounted to receive juice and pulp of the fruit as the peel is separated. An orifice tube has upper and lower ends and the upper end is moveable within the strainer tube. A reciprocating drive mechanism engages the orifice tube for reciprocating the orifice tube within the strainer tube for generating pressure within the strainer tube to separate juice and pulp within the strainer tube, collect the core, and discharge the core out of the lower end of the orifice tube.

A valve assembly is positioned at the lower end of the orifice tube. The valve assembly further comprises a piston having a shaft moveable into an extended position within the orifice tube and a retracted positioned where core can be discharged from the lower end of the orifice tube. A predetermined amount of hydraulic pressure is applied onto the piston to extend the shaft into the orifice tube and apply back pressure. Core is discharged from the lower end of the orifice tube when the pressure of the core against the shaft and piston exceeds the back pressure, resulting in the shaft retracting back from the orifice tube.

In one embodiment of the present invention, about 20 to about 60 pounds psi of hydraulic pressure is applied onto the piston. In still another aspect of the present invention, sensor means senses when the cylinder shaft is not retracted indicative that core is not being discharged from the orifice tube. After determining that the cylinder shaft is not retracted, extractor shut down means that is responsive to the sensor means can shut down the juice extractor after a predetermined period of time. This allows some margin of error in case some fruit is missed or not fed into an extractor unit. There will always be a chance that some units in a ganged juice extractor machine will not have a fruit fed for perhaps 20 or 30 seconds, and thus it would not be economically feasible to shut the juice extractor machine down. However, after a predetermined period of time, for example, for one minute, if there is no retraction of the piston, indicative that core is not being discharged from the orifice tube, the juice extractor can be shut down.

In still another aspect of the present invention, the sensor means comprises a piston proximity switch. In still another aspect of the present invention, the sensor means comprises means for measuring the hydraulic pressure on the piston to determine pressure spikes indicative of pressure generated by the core within the orifice tube that forces the shaft into a retracted position. When excess core is forced into the orifice tube, excess pressure is formed that exceeds the back pressure, causing a pressure spike that can be measured. A hydraulic feed line supplies hydraulic fluid to the valve assembly, and applies hydraulic fluid to the valve assembly. The hydraulic pressure measuring means can further comprise a hydraulic pressure gauge that measures hydraulic pressure within the hydraulic feed line.

In still another aspect of the present invention, the valve assembly comprises a valve body forming a cylinder in which the piston is mounted. A shaft opening is formed in the top of the valve body through which the piston shaft extends out of the valve body. A flange can be formed on the shaft to cause fruit juice to flow over the flange away from the shaft opening formed in the valve body. The piston can also include a piston ring for sealing between the piston and cylinder. The valve body can further comprise means for feeding hydraulic fluid into the cylinder against the piston, which can further comprise a fluid inlet and outlet orifice.

In yet another aspect of the present invention, the means for applying a predetermined amount of hydraulic pressure can comprise a hydraulic feed line connected to the valve assembly, and an air cylinder and piston for controlling the hydraulic pressure through the hydraulic feed line. The shaft can further comprise a cylinder portion having a slotted opening formed on the cylinder portion from which core is discharged when the cylinder shaft is moved into its retracted position.

The juice extractor can also include means for threadably mounting the valve assembly onto the bottom of the orifice tube. The shaft can include a mechanical knuckle joint to account for mechanical misalignment. The mechanical knuckle joint is advantageous because precision machine parts would not be necessary, especially with threaded connections. The juice extractor can also include a guide channel and the valve assembly can include a guide member that engages the guide channel to prevent the piston and shaft from rotating within the valve assembly in the orifice tube.

The reciprocating drive means can comprise a mounting assembly that is received over the orifice tube and a drive beam that connects to the mounting assembly. In a ganged system having three or more ganged juice extractor units, the drive beam would be moved vertically along bushings to cause the orifice tubes in each juice extractor unit to be raised together. The means for supporting the exterior of a fruit and separating the peel therefrom can comprise interdigitating upper and lower cups. Each cup can include a cutter for producing plugs in the fruit.

A method aspect of the present invention allows operation of a juice extractor and comprises the steps of supporting the exterior of a fruit and peeling the label therefrom. The method further comprises receiving the juice and pulp within a strainer tube and reciprocating an orifice tube within a strainer tube for generating pressure within the strainer tube to separate juice and pulp within the strainer tube, collecting core material, and discharging core material out of the lower end of the orifice tube. The method can further comprise hydraulically biasing a piston having a shaft that extends into the orifice tube to apply back pressure into the orifice tube when the shaft is extended into the orifice tube. The method can also comprise discharging core from the orifice tube when the pressure of the core against the shaft and piston exceeds the back pressure and the shaft is retracted.

In still another method aspect of the invention, the method further comprises the step of determining when the shaft has not retracted indicative that core is not being discharged from the orifice tube. The method also comprises the step of shutting down operation of the juice extractor after a predetermined period of time after determining that the shaft is not retracted. The method further comprises the step of measuring the hydraulic pressure in the piston to determine the lack of pressure spikes, which are indicative of pressure generated by the core within the orifice tube that forces the cylinder into a retracted position. The method also comprises the step of sensing movement of the piston by a proximity sensor to determine if the shaft has retracted. The method also comprises the step of hydraulically biasing the piston with about 20 to about 60 pounds psi.

BRIEF DESCRIPTION OF THE DRAWINGS

Other objects, features and advantages of the present invention will become apparent from the detailed description of the invention which follows, when considered in light of the accompanying drawings in which:

FIG. 7 is a sectional view of a portion of the orifice tube, mounting assembly and alignment bearing with the mounting assembly and alignment bearing secured against the split ring.

FIG. 8 is a view similar to FIG. 7, but showing the split ring and fiber optic sensor sheared when the orifice tube is lodged within the strainer tube, while the mounting assembly and alignment bearing moves upward relative to the orifice tube.

FIG. 9 is another view similar to that of FIG. 7.

FIG. 10 is a view similar to FIG. 9, but showing the split ring and fiber optic sensor sheared by the mounting nut member or "cap" as it is forced downward, such as when the orifice tube seizes within the strainer tube during the downward stroke.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The juice extractor machine of the present invention is advantageous over other prior art juice extractor machines because as an orifice tube becomes lodged within a strainer tube, damage is minimized or prevented to other portions of the juice extractor by the cooperation of the release member with the orifice tube and the mounting assembly to permit release and relative movement of the mounting assembly relative to the orifice tube.

Additionally, the present invention provides an alignment bearing to provide for orifice tube misalignment and does not require an oil bath. Alternatively, in older prior art machines, the fruit juice or foreign material could contaminate the oil bath, causing metal-to-metal contact, and machine wear. The alignment bearing of the present invention is interposed between the mounting assembly and the orifice tube and allows pivotal movement of the orifice tube relative to the mounting assembly to account for any mechanical misalignment of the orifice tube, such as when it moves within the strainer tube, and account for beam misalignment of the drive mechanism. The mounting assembly is preferably formed from plastic, such as PBT, to lessen the overall weight of the mounting assembly.

Also, the use of the hydraulic valve assembly positioned at the lower end of the orifice tube, together with a sensor for determining when a piston and its associated shaft are not retracted to allow core material withdrawal, is advantageous. If no core material is withdrawn from the lower end of the orifice tube after a predetermined period of time, the machine can be shut down, thus increasing efficiency in juice production because no "exploding fruit" occurs on a long term basis.

For purposes of description, a general description of the overall juice extraction process from unloading to final processing and waste handling is described with reference to FIGS. 1 and 2. FIG. 3 shows an environmental, partial isometric and sectional view of a portion of a juice extractor unit of the present invention, which is shown positioned in respective juice extractor machines 40 of the present invention. The description will proceed with component parts of the juice extractor unit described in accordance with the present invention relative to the overall juice extractor machine.

Figure 2:
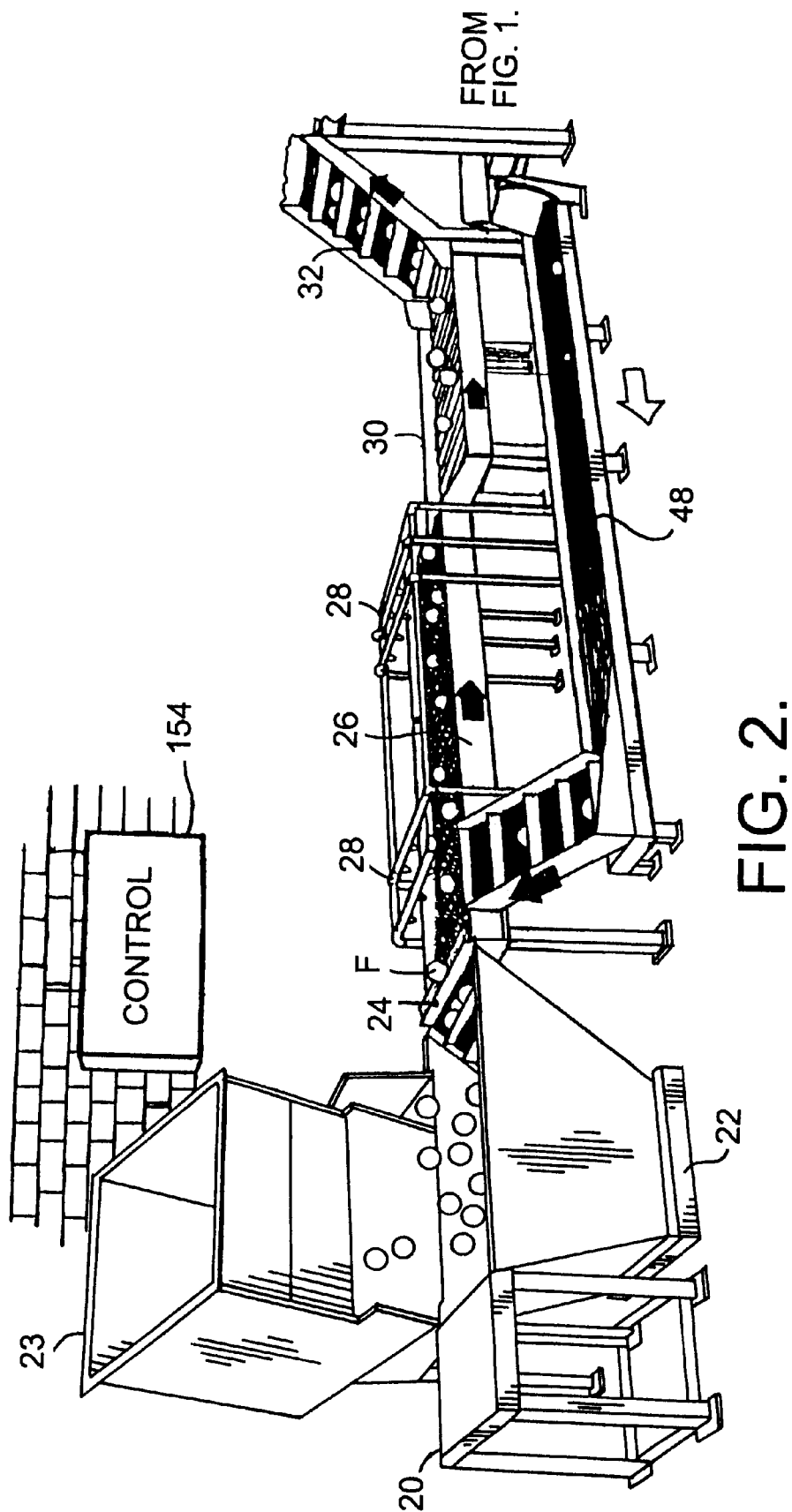
Figure 3:
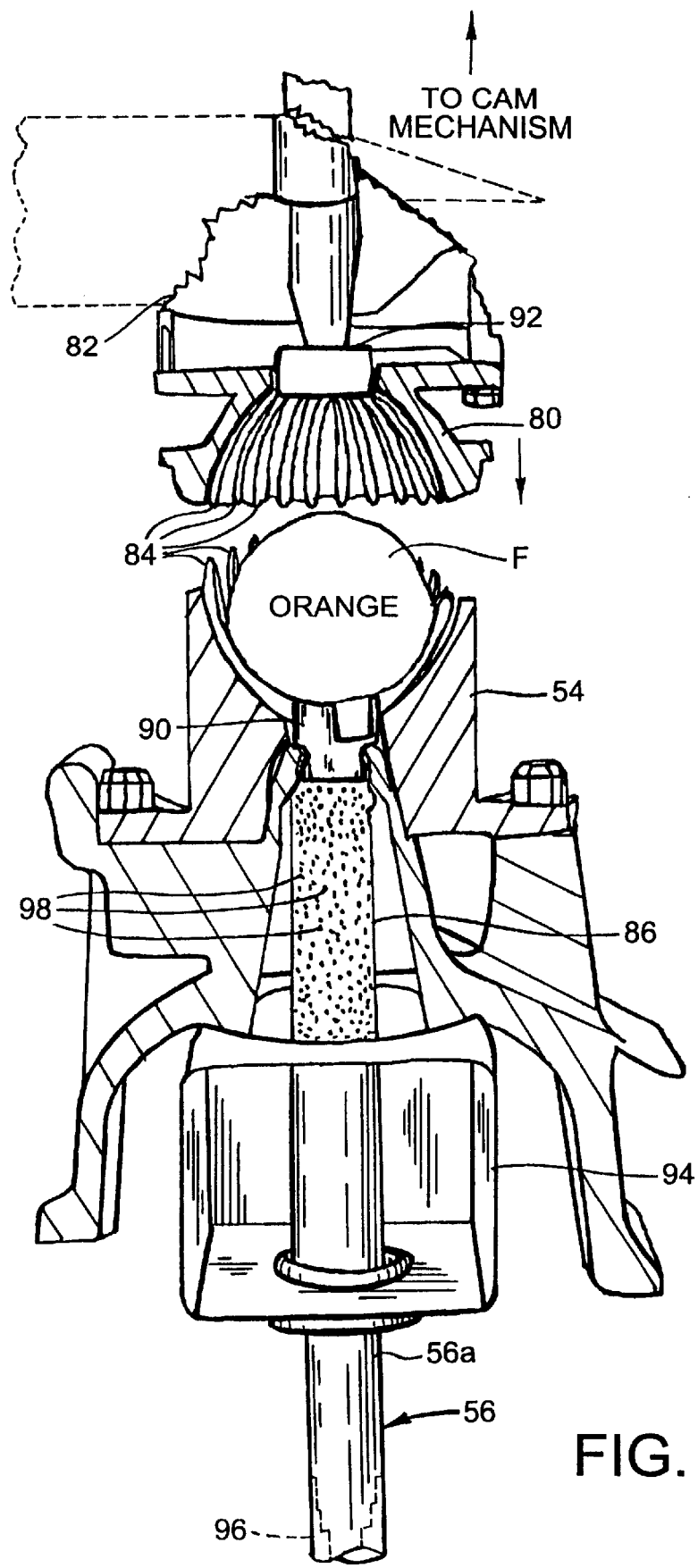
FIG. 3 is a partial isometric and schematic view of a portion of a juice extractor unit showing the upper and lower cups, strainer tube and orifice tube.

As shown in FIG. 2, fruit F can be unloaded by manual, hydraulic or truck unloading. For example, fruit can be unloaded manually by workers handling many field boxes or cartons, which can be set on a dump ledge 20 for unloading into a hopper 22. Additionally, citrus fruit could be dumped into the hopper 22 by means of an automatic hydraulic dump 23. A large load carrying citrus fruit F, such as oranges, could also arrive by truck, which would dump the fruit into the hopper 22. The hopper 22 includes a vertical conveyor belt 24 that carries fruit F on the necessary conveyors to a brush washer 26. Typically, the conveyor belt 24 has about three inch cleats to elevate fruit to the brush washer 26, as known to those skilled in the art. As the fruit is unloaded, the fruit enters a washer and passes under spray nozzles 28, where fruit cleaners can be applied.

The fruit, as it is washed, passes over a series of brushes in the brush washer 26, where the fruit is gently scrubbed to remove field oils, soil, mold and dust. The brush washer 26 then discharges the fruit onto a roller grader 30 where workers can easily select the fruit. Typically, the roller grader 30 is formed such that workers can stand on either side and remove any broken pieces, leaves and other undesirable materials from the flow of fruit supply. It is at this point that some foreign material can still pass through the roller grader. Foreign material, such as milk weed pods are one example that workers often miss. These milk weed pods are indigenous to citrus growing areas and can cause problems during the juice extraction process. The present invention is advantageous because it allows the juice extractor to shut down when the orifice tube becomes lodged within the strainer tube, such as by foreign material, and it allows the juice extractor to shut down operation if a milk weed pod or other similar foreign material becomes stuck in the orifice tube.

Figure 1:
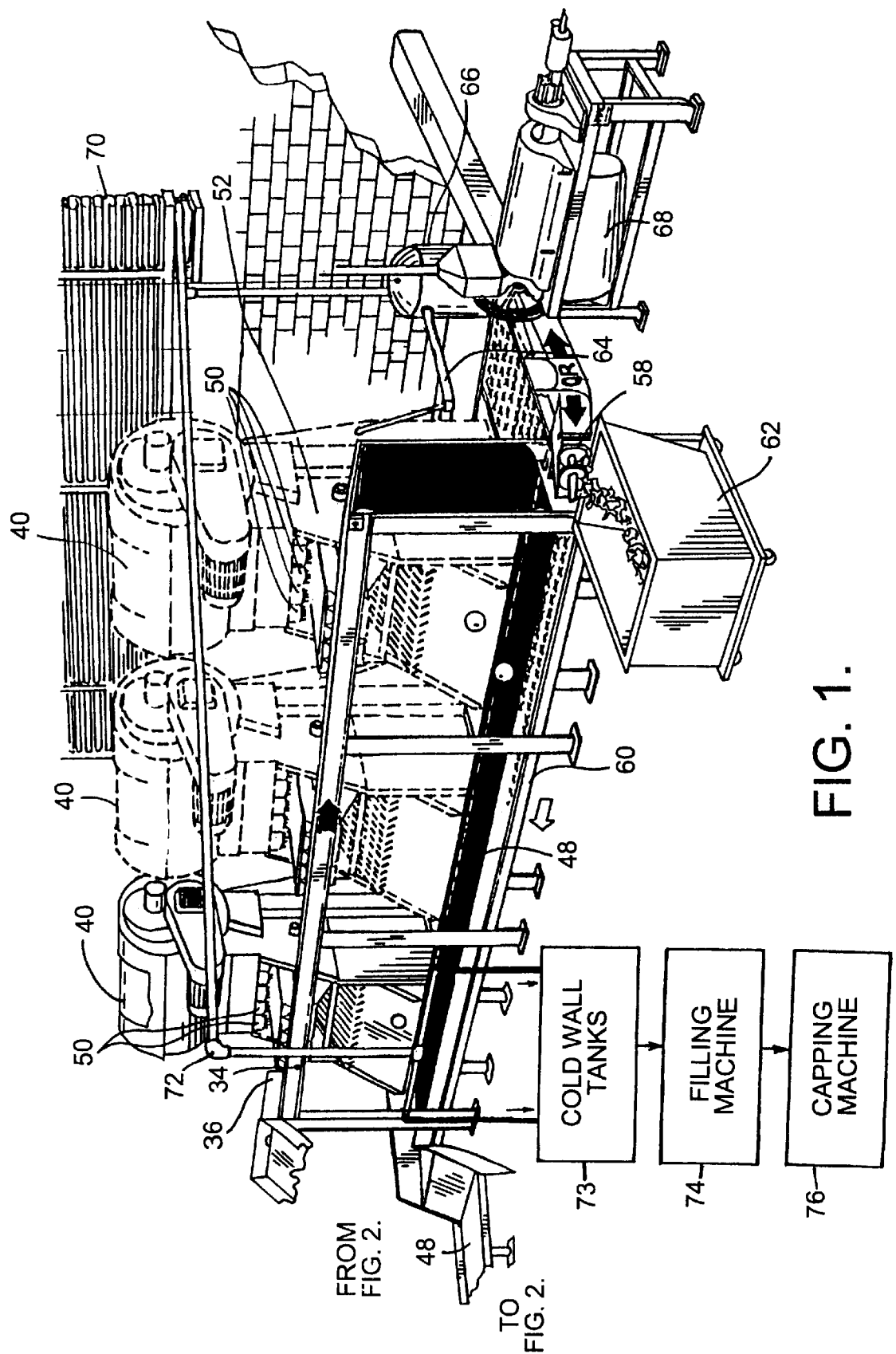
FIGS. 1 and 2 are an overall schematic, perspective views of a juice extraction process, including three juice extractors of the present invention shown in FIG. 1, each having five individual juice extractor units comprising upper and lower cups, a strainer tube and orifice tube that are ganged together by a drive beam that supports mounting assemblies.

The fruit discharges from the roller grader into a cleated belt conveyor 32 that elevates the fruit typically by three inch cleats to the tilted feed belt conveyor 34, as shown in FIG. 1. If two or more juice extractors are placed in tandem as illustrated, a sizing roller 36 provides a single, continuously rotating roller on the tilted feed belt conveyor 34 to separate the fruit into sizes equivalent to the size range of the extractor upper and lower cups to ensure maximum yield and quality. For example, as illustrated with the three juice extractors 40 of the present invention, one juice extractor can be used for one range of fruit size, and the other two juice extractors can be used for respective two other ranges of fruit sizes. As shown in FIG. 1, each juice extractor 40 of the present invention includes individual extractor units 50 (illustrated as five units) that are ganged together in a common frame 52 forming a juice extractor machine 40.

The fruit is moved to the hoppers 46 of the juice extractors 40 by a feed belt conveyor 34 that is designed at an angle of about 18° with the low side. Any fruit that passes by the juice extractor hoppers is recirculated through a fruit handling system by a return fruit conveyor 48. This fruit could be transferred back to the fruit handling system prior to washing.

Referring now to FIG. 3, there is illustrated a portion of a juice extractor unit 50 that allows extraction of the citrus juice. The fruit enters the juice extractor hopper 46 and is fed into the lower cup 54 by flipper fingers (not shown). As will be explained later in detail, the fruit is separated into three primary product streams, a pulpy juice, the peel and foreign material that enters an orifice tube 56. The waste peel is directed onto a peel screw 58 located under the juice extractor platform 60 and is discharged into a hopper 62 or other waste disposal container, or it can be conveyed through an exterior wall to a truck or trailer.

Typically, the juice extractors 40 are supported on the elevated platform 60 to provide not only support for the juice extractors, but also to provide access for mechanical operation and maintenance. The juice from the various juice extractors 40 enters a stainless steel discharge header 64 extending from each juice extractor and is gravity fed into a surge tank 66 that is designed to maintain a constant flow of juice, preferably to an optional finisher 68. The finisher further removes pulp from the juice by using stainless steel screens with small perforations. A finisher 68 typically is used when a number of juice extractors are placed in tandem, as illustrated.

The juice can be pumped from the surge tank 66 or finisher 68 to a chiller 70 and then through pipe system 72 into cold wall tanks 73 that are insulated and usually formed from stainless steel to store the product at the desired temperature until entering a filling machine 74 where the juice fills metal, plastic or glass containers. The containers are capped in a capping machine 76, such as either by screw or snap capping, which completes the filling process. The capped containers then move via conveyor to a storage area or box filler for subsequent distribution to a customer. Naturally, any final design of the juice extraction process is based on the particular type of processing and the design requirements stated by those skilled in the art.

Referring back once again to FIG. 3, a portion of a basic juice extractor unit 50 is illustrated and includes an upper cup 80, mounted on a common cross bar 82, which interconnects other upper cups of other juice extractor units. The cross bar 82 moves in a fixed up and down direction by a cam drive (not shown) contained in the top portion of a juice extractor. The bottom cups 54 are rigidly positioned to the frame 52. The upper and lower cups 80,54 are formed as interdigitated cups that have fingers 84 that intermesh together when the upper cup 80 is moved into the lower cup 54.

The upper and lower cups 80,54 and the associated components, such as a prefinisher strainer tube 86, the orifice tube 56 and the mounting assembly 88, form one juice extractor unit 50. As illustrated in FIG. 1, a number of juice extractor units can be ganged together in one juice extractor machine 40 to increase production. The illustrated juice extractor machine includes five juice extractor units 50 in one juice extractor machine. A feeding device also works as a cam-operated device, and includes feeding fingers (not shown) that deposit a single fruit in the lower cup 54, such as by tossing the fruit into the cup.

The cam-operated drive system in the upper part of the machine then forces the upper cup 80 into the lower cup and as this occurs, the fruit F is pressed against a circular cutter tube 90 located at the top of the prefinishing strainer tube 86. This cutter 90 cuts a plug in the bottom of the fruit to allow the internal portions of the fruit access to the strainer tube 86. An upper cutter 92 also cuts a plug in the top of the fruit to permit separation of the peel from the internal portions of the fruit, such as the pulp. As the fingers 84 of the cups 54,80 interdigitate or mesh together, the inner portion of the fruit, such as the pulpy juice, is forced down into the strainer tube 86 contained within the juice manifold 94. The peel surfaces do not contact the juice and any contamination by the extractives in the peel are minimized. The peel then falls away outside the juice manifold 94 and can be collected by the peel screw conveyor 58 under the extractor platform 60 and discharged into the hopper 62 or other waste disposal container and conveyed through an exterior wall to a truck or trailer.

The prior art had an orifice tube 56, which included a fixed restrictor adjacent its upper end, and was typically formed as a three-part restrictor formed as blockages. The continuing downward stroke of the upper cup 80 and the presence of a restrictor, in the form of the blockages, forced the juice-bearing portion of the fruit through the strainer tube's perforated wall formed by strainer tube holes 98 and into the juice manifold 94.

The present invention uses a valve assembly 100, which applies back pressure into the orifice tube and has closed the lower end of the orifice tube. The orifice tube moves upward to compress any entrapped fruit particles and force any remaining juice through the perforated wall of the strainer tube.

When the pressure in the orifice tube exceeds the back pressure supplied by the valve assembly 100, any core material, such as section membrane and seed, are ejected from the lower portion of the orifice tube during upward movement of that tube. This cycle of extraction is then complete. Naturally, by adjusting the back pressure at the valve assembly positioned at the lower end of the orifice tube, the amount of pressure applied inside the orifice tube can be varied to allow greater compressing of the pulp and other internal portions of the fruit to obtain more juice. However, too much back pressure could cause too many contaminants to be pressed into the juice.

Additionally, the amount of juice yield and the type of juice can be varied by using different strainer tubes with different size holes 98. Additionally, the height by which the orifice tube rises within the strainer tube can be changed to vary the juice yield and type of juice. Additionally, the back pressure can be varied as noted before. Peel oil, such as liberated by the shredding action of the upper and lower cups' fingers, typically can be washed by water sprays around the extraction cups.

Figure 4:
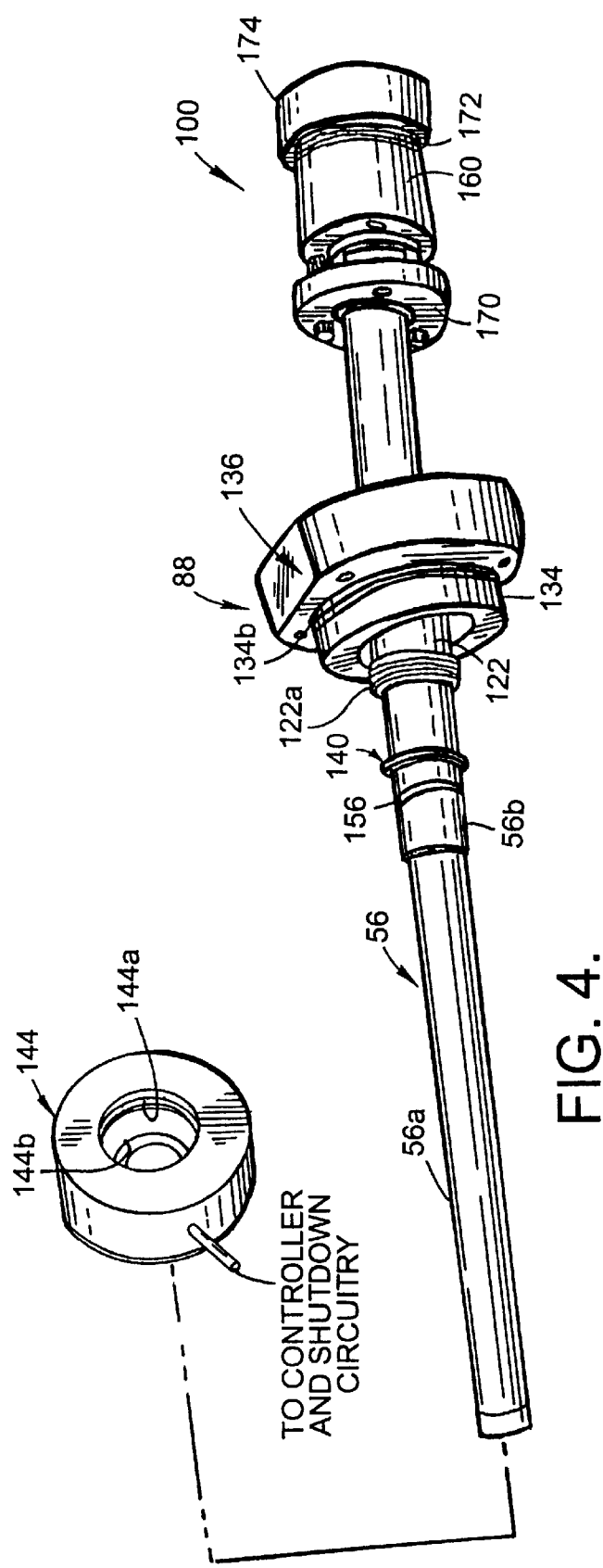
FIG. 4 is an environmental view of the orifice tube with the release member in the form of split ring, the mounting assembly and alignment bearing released on the orifice tube and showing the mounting nut member or "cap" unscrewed from the alignment bearing, and the valve assembly positioned at the lower end of the orifice tube.
Figure 6:
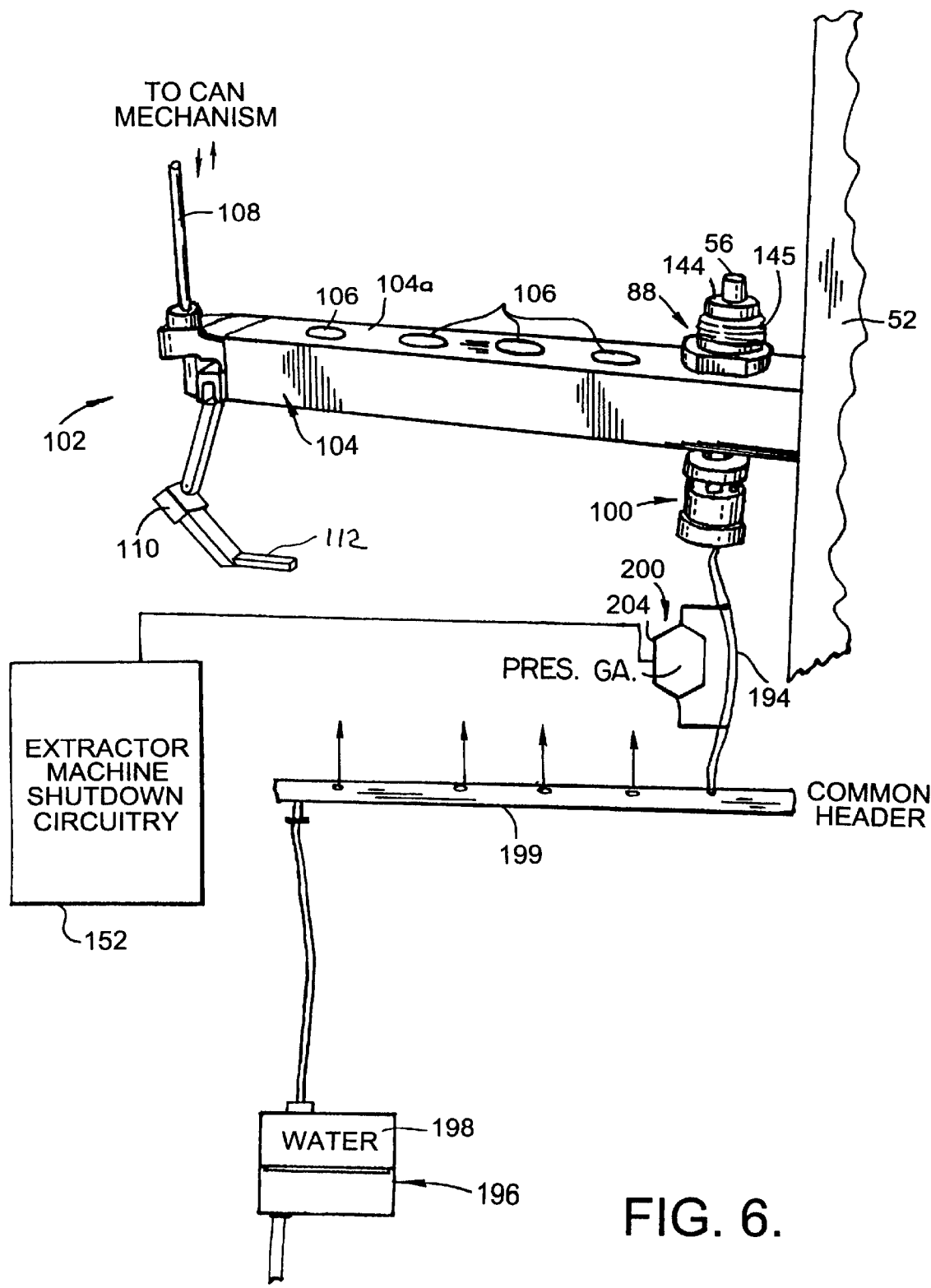
FIG. 6 is a partial schematic and isometric view of the drive beam having a portion of the orifice tube mounted to the mounting assembly positioned on the drive beam and showing the pressure gauge extending from the hydraulic feed line into a common header.
Figure 11:
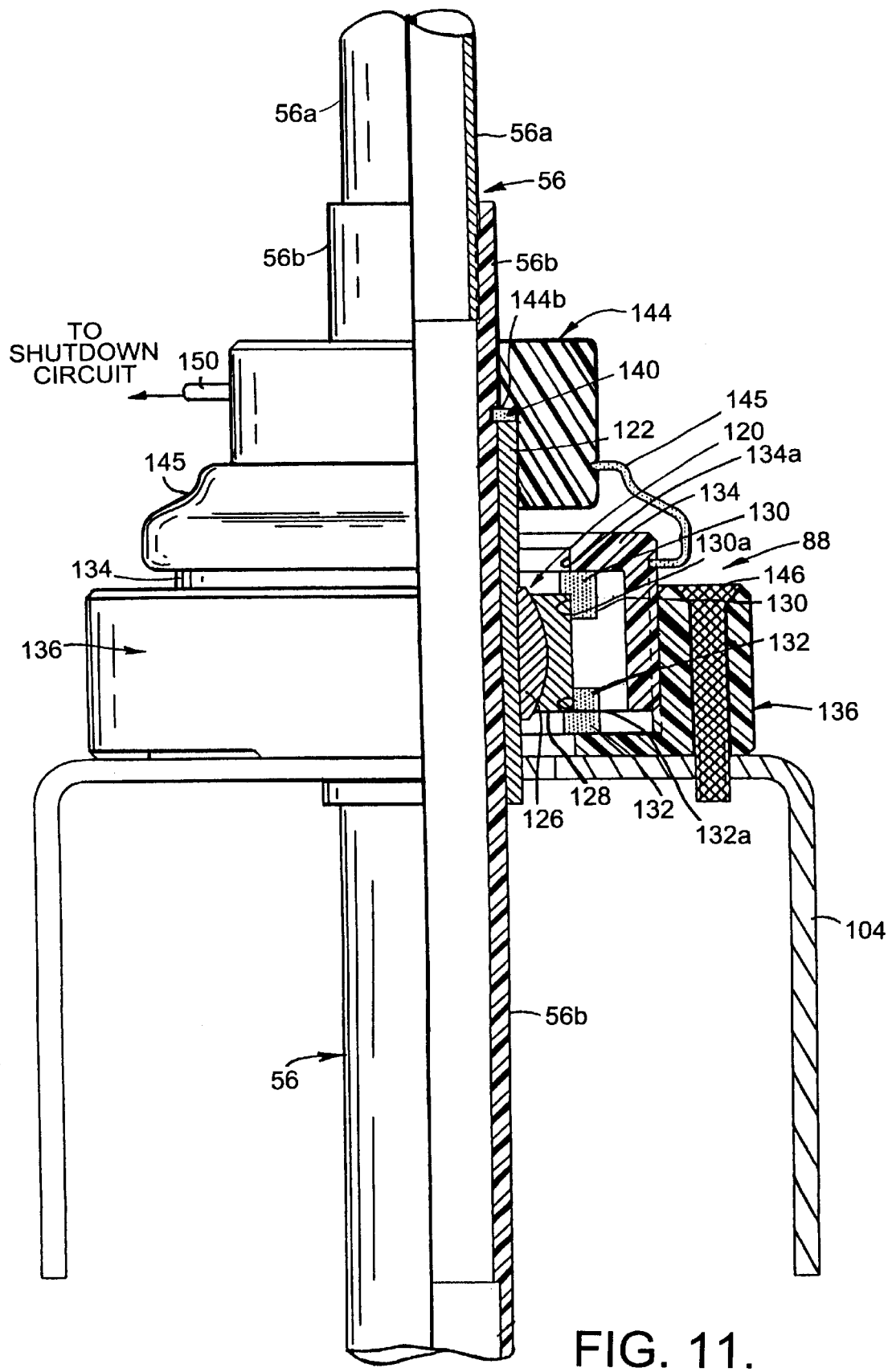
FIG. 11 is a partial sectional view in elevation of the mounting assembly, alignment bearing and orifice tube of the present invention, and showing the mounting assembly secured to the drive beam by bolts.

Referring now to FIGS. 4, 6 and 11, as illustrated in greater detail, a respective mounting assembly 80 is positioned on each respective orifice tube 56 and works in conjunction with a reciprocating drive means shown generally at 102 in FIG. 6, which includes a drive beam 104 mechanism that engages each mounting assembly for reciprocating orifice tubes 56 within the respective strainer tubes 86. The drive beam 104, as illustrated in FIG. 6, shows only a portion of one juice extractor unit 50, and shows the mounting assembly 88 and valve assembly 100. Holes 106 in the drive beam 104 receive other mounting units. The drive beam 104 is vertically moveable on bushings (not shown) and operated by cam-driven pull rods 108. A cam mechanism is located in the upper portion of the machine as mentioned before. A lever 110 and shaft 112 act as a take down mechanism.

The mounting assembly 88 includes an alignment bearing 120 (FIG. 11) interposed between the mounting assembly 88 and the orifice tube 56 and allows pivotal movement of the orifice tube 56 relative to the mounting assembly 88 to account for any mechanical misalignment at the drive beam 104 and strainer tube 86. The mounting assembly 88 is typically formed from plastic component parts, such as formed from PBT, which are lightweight and do not flow under stress and, thus, are essentially non-compressable. This type of plastic can be used to aid in holding the alignment bearing 120 interposed between the mounting assembly and the orifice tube, without an oil bath.

As illustrated in FIGS. 4 and 11, the alignment bearing 120 is formed as a bearing collar 122 received over the orifice tube, and includes an upper end with threads 122*a*. A hemispherical ball member 126 is received on the bearing collar 122 and can be formed integral or press fitted on the bearing collar 122. A swivel collar 128, as known to those skilled in the art, is received over the hemispherical ball member 126 and is pivotal on the ball member. The swivel collar 128 has a length less than the length of the bearing collar 122. At least one mounting ring, and as illustrated, upper and lower mounting rings 130,132 are positioned at the upper and lower ends of the swivel collar 128. The mounting rings 130,132 each include a shoulder 130*a*, 132*a* to prevent the rings from passing beyond the ends of the swivel collar 128 and are dimensioned to fit in a slight interference fit with the collar so that the mounting rings are secured tightly to the swivel collar. The mounting rings 130,132 are formed from a glass impregnated polyester to form an inexpensive, yet substantially incompressible and sufficiently strong mounting structure for the alignment bearing 120, and which can withstand wear and tear that may occur with movement of component parts.

Figure 5:
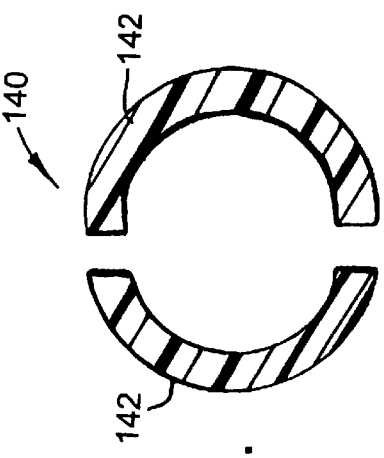
FIG. 5 is a sectional view of the split ring shown in FIG. 4.

The mounting assembly 88 also includes a mounting collar 134 in which the alignment bearing 120 and the mounting rings 130,132 are received. The mounting collar 134 includes a shoulder 134*a* that engages the upper mounting ring 130. The mounting collar 134 has external threads 134*b* (FIG. 4) that are machined to fit easily with internal threads on a mounting lock nut 136 that locks the alignment bearing 120 and mounting rings 130,132 within the mounting collar 134. A release member 140 in the form of a split ring of two equal ring sections 142 (FIG. 5) is received on the orifice tube 56 and forms a shoulder stop that engages the top portion of the bearing collar 122 received over the orifice tube.

A mounting nut member formed as a cap 144 passes over the orifice tube (FIG. 4), and has internal threads 144*a* that engage with the external threads 122*a* on the bearing collar 122 to lock the mounting nut member 144 and alignment bearing 120 against the split ring 142 forming the shoulder. A rubber cap 145 covers the mounting nut member 144 to protect from juice spills. Four bolts 146 lock the mounting lock nut 136 to the crossbar 104*a* of the drive beam 104. As illustrated, the drive beam crossbar 104*a* can include five mounting assemblies removably attached thereto. The drive beam 104 is moveable on bushings as described before.

It is clearly evident that the design of the mounting assembly component parts using plastic, such as a PBT plastic, is lightweight and structurally strong. The use of the glass impregnated polyester mounting rings 130,132 also secures the alignment bearing and allows pivotal movement of the orifice tube for mechanical misalignment while withstanding wear when there is any free play and component part movement. This type of structure is advantageous when the tolerance among machined and formed component parts is not made to high critical dimensions, such as to save on design, production and maintenance costs. Additionally, an oil bath does not have to be used, which would create problems when the oil bath is contaminated by fruit juice, causing metal-to-metal contact and, thus, machine operability problems.

Another advantageous aspect of the present invention is the release member 140 formed as a shoulder, as described before, which cooperates with the orifice tube 56 and the mounting assembly 88 to permit release and relative movement of the mounting assembly relative to the orifice tube, responsive to the orifice tube becoming lodged within the strainer tube 86. This function prevents damage to other portions of the juice extractor.

As illustrated and noted before, the drive beam 104 is moveable on bushings and moveably by the cam-driven pull rods 108. If the orifice tube should engage foreign material, such as a twig or gravel, within the strainer tube or become lodged, such as when the strainer tube becomes overheated and the orifice tube seizes, the upward force generated by the drive beam 104 could cause damage to the pull rods and other components of the juice extractor. The drive beam 104 exerts anywhere from 1,000 to 1,500 psi on the total machine, and 200 to 1,000 psi on individual juice extractor units. Thus, if an orifice tube is jammed, it is clear some damage could occur to other components of the machine. Other damage could occur to the orifice tube, the strainer tube and the various cam mechanisms as described before.

As noted, the release member 140 comprises a split ring 142 received on the orifice tube within a groove 148 formed on the orifice tube. The split ring 142 shears when excessive pressure is applied as when the orifice tube becomes lodged within the strainer tube. The split ring 142 is advantageous because it is easier to place in the groove 148. The ring is formed preferably from plastic selected from a group consisting of PBT and Erylite, which allows shearing and does not flow when the excessive force is applied. Other materials can be substituted which allow shearing, but does not flow, as known to those skilled in the art. The circumferential groove 148 receives the split ring to a depth of about 1/16th of an inch. A greater percentage of the ring extends beyond the orifice tube as illustrated in FIGS. 7, 9 and 11. The ring is formed from the material such as PBT or Erylite, such that upon shearing (FIG. 8) as on an upward stroke, a portion of the ring is retained within the groove 148 and expands between the bearing collar 122 and the orifice tube 56 to grip the bearing collar 122 and allow frictional sliding movement between the orifice tube 56 and the bearing collar.

When this type of shear failure occurs, normally in the direction when the orifice tube moves vertically upward, the mounting assembly 88 and drive beam 104 continue their upward movement relative to the orifice tube 56, which is prevented from moving upward by the lodgement of other foreign material contained in the strainer tube. At the same time, a fiber optic sensor 150 determines when the relative movement of the mounting assembly occurs relative to the orifice tube and signals a juice extractor shut down circuit 152, which is part of control circuit 154 (FIG. 2). The shut down circuit 152 is responsive to the sensor 150 for shutting down operation of the juice extractor upon the sensed relative movement of the mounting assembly relative to the orifice tube. When the juice extractor is shut down, a technician can then remove the orifice tube 56 and unscrew an upper metal portion 56*a* of the orifice tube from a lower plastic portion 56*b* and readily remove this plastic portion by extracting it with hammer blows to remove it from the bearing collar.

The split ring 142 is formed to expand and allows some sliding movement, but still allows the orifice tube 56 to grip the bearing collar and allow some frictional sliding movement between the orifice tube and bearing collar. In a worst case scenario, the juice extractor machine may cycle one or two times, but the sensor of the present invention in the form of a fiber optic sensor and the shut down circuitry works quickly.

As illustrated in FIGS. 7–10, the orifice tube 56 also includes a circumferential groove 156 and the fiber optic sensor 150 extends through the mounting nut member or "cap" 144 such that the tip of the fiber optic sensor 150 is received within the groove 156. For each of the individual juice extractor units, individual fiber optic sensors 150 can be "daisy chained" together. The tip is broken when the mounting assembly moves relative to the orifice tube, causing the bearing collar 122 to break the tip of the fiber optic sensor.

In the case when the orifice tube may become lodged in its downward stroke direction, an internal shoulder 144b of the mounting lock member or "cap" 144 would be forced against the split ring 142 and shear the split ring, as noted before, except the split ring 142 would shear in the downward direction. The cap 144 or mounting nut member would also break the fiber optic sensor and, thus, machine operation would terminate. The split ring 142 in this instance would also expand, except this time between the cap 144 and orifice tube 56.

Figure 12:
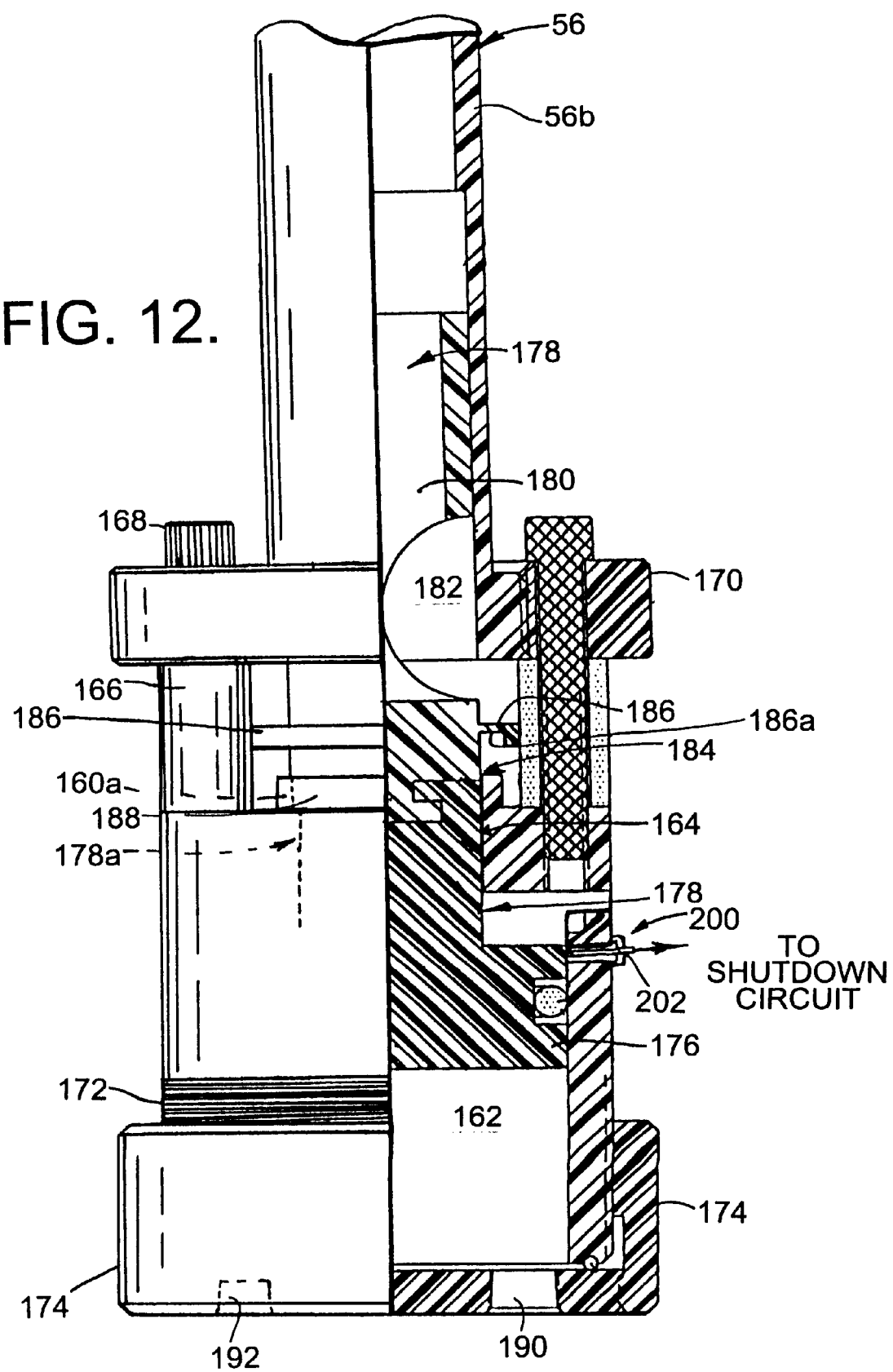
FIG. 12 is a partial sectional view in elevation of a valve assembly of the present invention.

Referring now to FIGS. 4, 6 and 12, greater details of the valve assembly 100 that is positioned at the lower end of the orifice tube 56 are described. The valve assembly 100 includes hydraulic valve control means for adding back pressure into the orifice tube. As illustrated, the valve assembly 100 includes a valve body 160 that forms a piston cylinder 162 and has an opening 164 adjacent the lower end of the orifice tube (FIG. 12). The valve body 160 includes three vertical support members 166 that are equidistantly spaced, and secured by screws 168 in an annular configured mounting plate 170 having internal threads that engage external threads formed on the lower end of the orifice tube, as illustrated.

As illustrated best in FIG. 12, the valve body 160 includes a lower end having external threads 172 that engage a valve body cap 174 to form a closed valve body. A piston 176 is mounted within the piston cylinder 162. The piston includes a groove that receives a piston ring 178 to seal between the piston and internal cylinder wall. A piston shaft 178 extends out of the opening 164 of the valve body and is moveable into an extended position where it is positioned within the orifice tube. The upper portion of the shaft 178 includes a cylindrical portion 180 that has a slotted opening 182 formed within the cylindrical portion 180 from which core can be discharged when the shaft is moved into a retracted position to expose the slotted opening to allow core discharge.

Just below the slotted opening 182, the shaft 178 includes a mechanical knuckle joint 184 to account for mechanical misalignment The knuckle joint 184 is advantageous because the plastic component parts, such as formed from PBT, are used to form the valve body, piston and annular mounting member, and typically, these parts may not form close tolerances. Thus, the knuckle joint 184 provides some clearance and accounts for any misalignment. The mechanical knuckle joint 184 is formed in the cylindrical portion 180 from two cylindrical members that are placed together with a knuckle formed on the cylindrical wall as illustrated.

The shaft 178 also includes a guide channel 178a (shown in dotted line configuration in FIG. 12) formed on the outside surface of the shaft. A guide member 160a (also shown in dotted line configuration in FIG. 12) is formed inside the opening 164 of the valve body and engages the guide channel 178a to maintain the shaft and piston in one orientation and prevent rotation. Thus, the core will be discharged through the slotted opening in one desired direction instead of all different directions around a 360° arc, if the shaft were to rotate.

A flange 180 is also formed on the shaft 178 and forms a recess 186a on the underside of the flange to engage annular shoulder 188 formed on the upper surface of the valve body 160 to act as a stop to prevent the shaft and piston from falling all the way through the valve body. The flange also acts to cause fruit juice to flow over the flange away from the opening 164 formed in the valve body. The juice can act as an adhesive under certain operating conditions and could cause the piston to stick in one position.

In accordance with the present invention, the valve assembly 100 is hydraulically controlled to extend the shaft 178 into the orifice tube 56 and apply back pressure. Core is discharged from the orifice tube when the pressure contained in the orifice tube against the valve assembly 100 exceeds the generated back pressure. The valve body cap 174 includes respective fluid inlet and outlet orifices 190,192. A hydraulic feed line 194 has one end connected to the fluid inlet 190 and the other end connected to a source of hydraulic fluid such as an air cylinder and piston assembly 196 that connects into a water reservoir 198 to supply hydraulic pressure via a common header 199 to the hydraulic feed line 194 and the fluid inlet. Although water is the preferred hydraulic fluid, other food grade hydraulic fluids can be used as known to those skilled in the art. An outlet hydraulic line could pass back into the water reservoir.

Preferably, about 20 to 60 pounds of hydraulic pressure is applied against the piston 178. Naturally, the amount of hydraulic pressure applied against the piston 178 also adjusts the amount of pressure applied in the orifice tube 56. A small amount of pressure applied onto the piston 178 has a much greater effect on the amount of pressure in the orifice tube 56 because of frictional differences and the fact that the piston forces the shaft upward into the orifice tube. A greater pressure on the piston 178 also causes a greater back pressure, which increases the amount of pressure in the orifice tube 56 during the extraction process, thus increasing the amount of juice extracted through the strainer tube 86. However, excessive back pressure can cause some contaminants to be pressed out of the pulp and into the juice. Depending on the type of fruit, this back pressure may be varied on each production run as desired.

When the amount of pressure in the orifice tube exceeds the back pressure, the piston is retracted back down, thus exposing the slotted opening 164 and allowing core to pass through the slotted opening.

At times, the core within the orifice tube can become clogged. This can occur such as when a milk weed pod or other foreign material is not removed by inspection from the various workers and is fed into the juice extractor. As an example, when the foreign material, such as milk weed pods, is crushed, the milk weed pod seeds are forced into the orifice tube and expand quickly causing a blockage. Other foreign material can also create a blockage. As a result, the blockage prevents any other core from entering the orifice tube and descending into the orifice tube to its lower end and out of the slotted opening 182 in the shaft. As a result, any fruit contained in the upper and lower cups 54,80 explodes and a phenomena known as "exploding fruit" occurs. This can go on for many days unless an operator visually inspects the machine and sees the "exploding fruit." In a worst case scenario, the strainer tube may break and, thus, the fruit would not explode, but the seeds and core would mix with the juice forming a bad byproduct that must later be strained through expensive equipment and processing.

In accordance with the present invention, a sensor 200 determines when the shaft 178 is not retracted, indicative that core is not being discharged from the orifice tube. The sensor 200 could also sense when the shaft may be partially retracted such as in a stuck position. The extractor shut down circuit 152 is responsive to the sensor 200 and shuts down the juice extractor after a predetermined period of time from the time when the sensor has determined that core is not being discharged.

There are times when two, three or more fruits may not be fed into an individual juice extractor unit 50, and thus, it may not be desirable to shut down operation just because the piston is not retracted to remove any core when only a few misfeeds occur. However, if the piston does not retract for at least a minute, for example, or for any other predetermined set period of time depending on the production parameters, then the extractor shut down circuit shuts down machine operation. As noted before, the fact that the piston does not retract could be indicative that the orifice tube is blocked or fruit is not being properly fed into the upper and lower cups.

In one aspect of the present invention as shown in FIG. 12, the sensor 200 can comprise a proximity sensor 202 that is placed in the valve body and senses the movement of the piston. If the piston is formed of metal, the proximity sensor could be a magnet. Other known proximity and motion sensors can be used as known to those skilled in the art.

Figure 13:
FIG. 13 is a graph showing a pressure spike such as caused when the piston of a valve assembly retracts to allow discharge of pulp from the lower end of the orifice tube.

In still another aspect of the invention, the sensor 200 comprises means for measuring the hydraulic pressure on the piston, such as a hydraulic pressure gauge 204 (FIG. 6). As a result, a pressure curve as shown in FIG. 13 can be measured when the orifice tube pressure increases and forces the piston 176 and shaft 178 into its retracted position. When the orifice tube increases pressure during the up cycle, a pressure spike is formed indicative of the pressure generated within the orifice tube that is over the back pressure (shown as 20 pounds psi) and forces the cylinder shaft into its retracted position. After the core is discharged, the pressure drops below 20 pounds psi as shown by the slight dip and then as the orifice tube begins its descent back down, the pressure increases to 20 pounds psi and forces the piston and shaft into the extended position to close off the lower end of the orifice tube and prevent any core material from discharging.

In accordance with one aspect of the present invention, when five ganged individual extractor units are placed together in a common frame, the hydraulic feed line 194 for each valve assembly can extend into a common header 199. Each hydraulic feed line 194 can include a hydraulic pressure gauge 204 placed in parallel with the respective hydraulic feed line to measure hydraulic pressure within the respective hydraulic feed line. The extractor shut down circuitry can be responsive to any one of the hydraulic pressure sensors and shut down operation of the juice extractor when only one juice extractor unit has failed within the juice extractor machine.

In operation, the fruit F is fed into each of the respective individual juice extractor units and the peel separated and the pulp placed in the respective strainer tube. As the respective orifice tubes rise by means of the drive beam, the back pressure produced by the hydraulics acting in the valve assembly 100 maintain the slotted openings 182 within the lower ends of the orifice tubes and maintains back pressure within the orifice tubes.

As the orifice tubes rise, any misalignment is compensated by the alignment bearings. If by chance an orifice tube lodges within a strainer tube, such as through foreign material or seizing through heat, the split ring 142 fitted in the groove around the orifice tube shears, allowing some movement of the mounting assembly relative to the orifice tube and, as a result, the fiber optic sensor is sheared, causing the juice extractor shut down circuitry to shut down operation of the juice extractor machine.

If the orifice tube becomes blocked with foreign material for a predetermined period of time, or no core is being discharged out of the lower end of the orifice tube, the sensor, whether a proximity switch or hydraulic fluid pressure gauge, senses this problem and after a predetermined period of time, the juice extractor shut down circuit shuts down operation of the juice extracting machine.

The present invention is advantageous for several reasons. First, even if the orifice tube becomes lodged within the strainer tube, the release member formed as the shearable ring on the orifice tube allows not only movement of the mounting assembly relative to the orifice tube, but also shuts down operation of the juice extractor machine to prevent damage to other components of the juice extractor machine. Additionally, the mounting assembly with its alignment bearing structure does not require any oil bath and provides a solid structure that is lightweight. The hydraulics used in conjunction with the valve assembly, piston and shaft provide greater pressure control and thus greater control over the back pressure to enhance the juice extraction process. Additionally, the sensor used in conjunction with the valve assembly allows greater control to determine when the orifice tube is blocked, or when no fruit is being fed into an individual juice extractor unit.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A juice extractor comprising:
    means for supporting the exterior of a fruit and separating the peel therefrom;
    a strainer tube mounted to receive juice and pulp of the fruit;
    an orifice tube having upper and lower ends, the upper end movable within the strainer tube;
    a drive mechanism engaging said orifice tube for reciprocating the orifice tube within the strainer tube for generating pressure within the strainer tube to separate juice and pulp within the strainer tube, collecting core, and discharging core out of the lower end of the orifice tube;
    a valve assembly positioned at the lower end of the orifice tube, said valve assembly further comprising:
        a piston having a shaft movable into an extended position within the orifice tube and a retracted position where core can be discharged from the lower end of the orifice tube; and
        means for applying a predetermined amount of hydraulic pressure onto the piston to extend the shaft into the orifice tube and apply back pressure, wherein core is discharged when the pressure of the core against the shaft and piston exceeds the back pressure to retract the shaft.

2. A juice extractor according to claim 1 wherein about 20 to about 60 pounds per square inch of hydraulic pressure is applied onto the piston.

3. A juice extractor according to claim 1 and further comprising sensor means for sensing when the shaft has not retracted or extended indicative that pulp is not being discharged from the orifice tube.

4. A juice extractor according to claim 3 and further comprising extractor shut down means responsive to the sensor means for shutting down the juice extractor after a predetermined period of time after determining that the shaft has not retracted or extended.

5. A juice extractor according to claim 3 wherein said sensor means comprises a piston proximity switch.

6. A juice extractor according to claim 3 wherein said sensor means comprises means for measuring the hydraulic pressure on the piston to determine pressure spikes indicative of pressure generated by the core within the orifice tube that forces the shaft into a retracted position.

7. A juice extractor according to claim 6 and further comprising a hydraulic feed line for applying hydraulic fluid to said valve assembly, wherein said hydraulic pressure measuring means further comprises a hydraulic pressure gauge that measures hydraulic pressure within the hydraulic feed line.

8. A juice extractor according to claim 1 wherein said valve assembly comprises a valve body forming a cylinder in which the piston is mounted, and including a shaft opening through which said shaft extends out of said valve body.

9. A juice extractor according to claim 8 including a flange formed on the shaft to cause fruit juice to flow over the flange away from the shaft opening formed in said valve body.

10. A juice extractor according to claim 8 wherein said piston includes a piston ring for sealing between the piston and cylinder.

11. A juice extractor according to claim 8 wherein said valve body further comprises means for feeding a hydraulic fluid into the cylinder against the piston.

12. A juice extractor according to claim 11 wherein said means for feeding a hydraulic fluid comprises a fluid inlet and outlet orifice.

13. A juice extractor according to claim 1 wherein said means for applying a predetermined amount of hydraulic pressure comprises a hydraulic feed line connected to said valve assembly, and an air cylinder and piston for controlling the hydraulic pressure through the hydraulic feed line.

14. A juice extractor according to claim 1 wherein said shaft further comprises a cylinder portion having a slotted opening formed on the cylinder portion from which core is discharged when the cylinder shaft is moved into its retracted position.

15. A juice extractor according to claim 1 including means for threadably mounting the valve assembly onto the bottom of the orifice tube.

16. A juice extractor according to claim 1 wherein said shaft includes a mechanical knuckle joint to account for mechanical misalignment.

17. A juice extractor according to claim 1 wherein said shaft includes a guide channel, and said valve assembly includes a guide member that engages said guide channel to prevent said piston and shaft from rotating within said valve assembly and said orifice tube.

18. A juice extractor comprising:
  means for supporting the exterior of a fruit and separating the peel therefrom;
  a strainer tube mounted to receive juice and pulp of the fruit;
  an orifice tube having upper and lower ends, the upper end movable within the strainer tube;
  a drive mechanism engaging said orifice tube for reciprocating the orifice tube within the strainer tube for generating pressure within the strainer tube to separate juice and pulp within the strainer tube, collecting core, and discharging core out of the lower end of the orifice tube;
  a valve assembly positioned at the lower end of the orifice tube, said valve assembly further comprising:
    a piston having a shaft movable into an extended position within the orifice tube and a retracted position where core can be discharged from the lower end of the orifice tube;
    means for applying a predetermined amount of pressure onto the piston to extend the shaft into the orifice tube and apply back pressure, wherein core material is discharged when the pressure of the core against the shaft and piston exceeds the back pressure to retract the shaft;
  a sensor for determining when the shaft has not retracted indicative that core is not being discharged from the orifice tube; and
  extractor shut down means responsive to the sensor for shutting down the juice extractor after a predetermined period of time from the time when the sensor has determined pulp is not being discharged.

19. A juice extractor according to claim 18 wherein about 20 to about 60 pounds per square inch of hydraulic pressure is applied onto the piston.

20. A juice extractor according to claim 18 wherein said sensor means comprises a piston proximity switch.

21. A juice extractor according to claim 18 wherein said sensor comprises means for measuring the hydraulic pressure on the piston to determine pressure spikes indicative of pressure generated by the core within the orifice tube that forces the shaft into a retracted position.

22. A juice extractor according to claim 21 and further comprising a hydraulic feed line for applying hydraulic fluid to said valve assembly, wherein said hydraulic pressure measuring means further comprises a hydraulic pressure gauge that measures hydraulic pressure within the hydraulic feed line.

23. A juice extractor according to claim 18 wherein said valve assembly comprises a valve body forming a cylinder in which the piston is mounted, and including a shaft opening through which said shaft extends out of said valve body.

24. A juice extractor according to claim 23 including a flange formed on the shaft to cause fruit juice to flow over the flange away from the shaft opening formed in said valve body.

25. A juice extractor according to claim 23 wherein said piston includes a piston ring for sealing between the piston and cylinder.

26. A juice extractor according to claim 23 wherein said valve body further comprises means for feeding a hydraulic fluid into the cylinder against the piston.

27. A juice extractor according to claim 26 wherein said means for feeding a hydraulic fluid comprises a fluid inlet and outlet orifice.

28. A juice extractor according to claim 18 wherein said means for applying a predetermined amount of hydraulic pressure comprises a hydraulic feed line connected to said valve assembly, and an air cylinder and piston for controlling the hydraulic pressure through the hydraulic feed line.

29. A juice extractor according to claim 18 wherein said shaft further comprises a cylinder portion housing a slotted opening formed on the cylinder portion from which core is discharged when the shaft is moved into its retracted position.

30. A juice extractor according to claim 18 including means for threadably mounting the valve assembly onto the bottom of the orifice tube.

31. A juice extractor according to claim 18 wherein said shaft includes a mechanical knuckle joint to account for mechanical misalignment.

32. A juice extractor according to claim 18 wherein said shaft includes a guide channel, and said valve assembly includes a guide member that engages said guide channel to prevent said piston and shaft from rotating within said valve assembly and said orifice tube.

33. A juice extractor comprising:
a strainer tube mounted to receive juice and pulp of the fruit;
an orifice tube having upper and lower ends, the upper end movable within the strainer tube;
reciprocating drive means engaging said orifice tube for reciprocating the orifice tube into and out of the strainer tube for generating pressure within the strainer tube to separate juice and pulp within the strainer tube, collecting core, and discharging core out of the lower end of the orifice tube; and
hydraulic valve control means positioned adjacent the orifice tube to extend the shaft into the orifice tube and apply back pressure, wherein core is discharged when the pressure of core contained in the orifice tube against said hydraulic valve control means exceeds the back pressure.

34. A juice extractor according to claim 33 wherein said hydraulic valve control means further comprises a valve assembly positioned adjacent the orifice tube.

35. A juice extractor according to claim 34 wherein said valve assembly further comprises a piston having a shaft movable into an extended position within the orifice tube, and moveable into a retracted position where core can be discharged from the orifice tube.

36. A juice extractor according to claim 35 wherein said valve assembly further comprises a valve body forming a cylinder in which the piston is mounted, and including a shaft opening through which said shaft extends out of the valve body.

37. A juice extractor according to claim 33 and further comprising means for supporting the exterior of a fruit and separating the peel therefrom.

38. A juice extractor comprising:
means for supporting the exterior of a fruit and separating the peel therefrom;
a strainer tube mounted to receive juice and pulp of the fruit;
an orifice tube having upper and lower ends, the upper end movable within the strainer tube;
reciprocating drive means engaging said orifice tube for reciprocating the orifice tube into and out of the strainer tube for generating pressure within the strainer tube to separate juice and pulp within the strainer tube, collecting core, and discharging core out of the lower end of the orifice tube;
a valve assembly mounted at the lower end of the orifice tube, said valve assembly further comprising:
a valve body forming a piston cylinder, and having an opening adjacent the lower end of the orifice tube;
a piston mounted within the piston cylinder and having a shaft extending out of the opening of the valve body and movable into an extended position within the orifice tube and a retracted position where core can be discharged from the orifice tube,
means for applying pressure onto the piston to extend the shaft into the orifice tube and apply back pressure, wherein core is discharged when the pressure of the core against the shaft and piston exceeds the back pressure to retract the shaft; and
sensor means for sensing when the shaft has not retracted for a predetermined period of time indicative that core is not being discharged from the orifice tube.

39. A juice extractor according to claim 38 wherein about 20 to about 60 pounds per square inch of hydraulic pressure is applied onto the piston.

40. A juice extractor according to claim 38 and further comprising extractor shut down means that is responsive to the sensor means for shutting down the juice extractor after a predetermined period of time after determining that the shaft has not retracted.

41. A juice extractor according to claim 38 wherein said sensor means comprises a piston proximity switch.

42. A juice extractor according to claim 38 wherein said sensor means comprises means for measuring the hydraulic pressure on the piston to determine pressure spikes indicative of pressure generated by the pulp within the orifice tube that forces the shaft into a retracted position.

43. A juice extractor according to claim 42 and further comprising a hydraulic feed line for feeding hydraulic fluid to said valve assembly, wherein said hydraulic pressure measuring means further comprises a hydraulic pressure gauge that measures pressure within the hydraulic feed line.

44. A juice extractor according to claim 38 including a flange formed on the shaft to cause fruit juice to flow over the flange away from the opening of the valve body.

45. A juice extractor according to claim 38 wherein said piston includes a piston ring for sealing between the piston and cylinder.

46. A juice extractor according to claim 38 wherein said valve body further comprises means for feeding a hydraulic fluid into the cylinder against the piston.

47. A juice extractor according to claim 46 wherein said means for feeding a hydraulic fluid comprises a fluid inlet and outlet orifice.

48. A juice extractor according to claim 38 wherein said means for applying pressure comprises a hydraulic feed line connected to said valve assembly to feed hydraulic fluid into the piston cylinder, and an air cylinder and piston for controlling the hydraulic fluid hydraulic feed line.

49. A juice extractor according to claim 38 wherein said shaft further comprises a cylinder portion, and a slotted opening formed within the cylinder portion from which core is discharged when the shaft is moved into its retracted position.

50. A juice extractor according to claim 38 including means for threadably mounting the valve assembly onto the bottom of the orifice tube.

51. A juice extractor according to claim 38 wherein said shaft includes a mechanical knuckle joint to account for mechanical misalignment.

52. A juice extractor according to claim 38 wherein said shaft includes a guide channel, and said valve assembly includes a guide member that engages said guide channel to prevent said piston and cylinder shaft from rotating.

53. A method of operating a juice extractor comprising the steps of:
supporting the exterior of a fruit and peeling the peel therefrom;
receiving the juice and pulp within a strainer tube;
reciprocating an orifice tube into and out of the strainer tube for generating pressure within the strainer tube to separate juice and pulp within the strainer tube, collecting core, and discharging core out of the bottom of the orifice tube;
hydraulically biasing a piston having a shaft that extends into the orifice tube to apply back pressure into the orifice tube when the shaft is extended into the orifice tube; and
discharging core from the orifice tube when the pressure of the core against the shaft and piston exceeds the back pressure and the shaft is retracted.

54. A method according to claim 53 and further comprising the step of determining when the shaft has not retracted indicative that core is not being discharged from the orifice tube.

55. A method according to claim 54 and further comprising the step of shutting down operation of the juice extractor after a predetermined period of time after determining that the shaft has not retracted.

56. A method according to claim 54 and further comprising the step of measuring the hydraulic pressure on the piston to determine the lack of pressure spikes, which are indicative of pressure generated by the core within the orifice tube that forces the cylinder into a retracted position.

57. A method according to claim 54 and further comprising the step of sensing movement of the piston by a proximity sensor to determine if the shaft has retracted.

58. A method according to claim 54 and further comprising the step of hydraulically biasing the piston with about 20 to about 60 pounds of pressure per square inch.

59. A method of operating a juice extractor comprising the steps of:

receiving the juice and pulp within a strainer tube;

reciprocating an orifice tube into and out of the strainer tube for generating pressure within the strainer tube to separate juice and pulp within the strainer tube, collecting core, and discharging core out of the bottom of the orifice tube;

biasing a piston having a shaft that extends into the orifice tube to apply back pressure into the orifice tube when the shaft is extended into the orifice tube; and discharging core from the orifice tube when the pressure of the core against the shaft and piston exceeds the back pressure and the shaft is retracted;

determining when the shaft has not retracted or extended; and shutting down the juice extractor after a predetermined period of time after determining that the shaft has not retracted or extended.

60. A method according to claim 59 and further comprising the step of measuring the hydraulic back pressure on the piston to determine the lack of pressure spikes, which are indicative of pressure generated by the core within the orifice tube that forces the cylinder into a retracted position.

61. A method according to claim 59 and further comprising the step of sensing movement of the piston by a proximity sensor to determine if the shaft has retracted.

* * * * *